United States Patent [19]
Komma et al.

[11] Patent Number: 5,754,512
[45] Date of Patent: May 19, 1998

[54] CORRECTION ELEMENTS TO LOWER LIGHT INTENSITY AROUND AN OPTICAL AXIS OF AN OPTICAL HEAD WITH A PLURALITY OF FOCAL POINTS

[75] Inventors: Yoshiaki Komma, Kyoto; Sadao Mizuno, Ibaraki; Hideki Hayashi, Katano; Kenichiro Urairi, Yawata, all of Japan

[73] Assignee: Matsushita Electric Industrial Co., Ltd., Kadoma, Japan

[21] Appl. No.: 654,771

[22] Filed: May 29, 1996

[30] Foreign Application Priority Data

May 30, 1995 [JP] Japan .................. 7-131360

[51] Int. Cl.⁶ .................................................. G11B 7/00
[52] U.S. Cl. ................... 369/112; 369/44.23; 369/94; 369/103; 369/116
[58] Field of Search .................... 369/112, 103, 369/44, 23, 118, 94, 44.12, 107, 109, 116

[56] References Cited

U.S. PATENT DOCUMENTS

| | | | |
|---|---|---|---|
| 4,460,990 | 7/1984 | Ophij | 369/112 |
| 5,247,510 | 9/1993 | Lee et al. | 369/112 |
| 5,446,565 | 8/1995 | Komma et al. | 369/112 |
| 5,496,995 | 3/1996 | Kato et al. | 369/44.12 |
| 5,612,942 | 3/1997 | Takahashi | 369/112 |

FOREIGN PATENT DOCUMENTS

| | | | |
|---|---|---|---|
| 61-189504 | 8/1986 | Japan . | |
| 62-67737 | 3/1987 | Japan | G11B 7/09 |
| 63-241735 | 10/1988 | Japan . | |
| 2-185722 | 7/1990 | Japan . | |

*Primary Examiner*—Georgia Y. Epps
*Assistant Examiner*—Kim-Kwok Chu
*Attorney, Agent, or Firm*—Wenderoth, Lind & Ponack

[57] ABSTRACT

An optical head apparatus which records or reproduces signals stably on optical disks having different thicknesses. A correction hologram element or a correction filter is provided between a light source and a 2-focus lens in order to decrease optical intensity at a portion distant from the optical axis or to change the optical path length. The light which passes the correction hologram element or a correction filter is converged by the 2-focus lens as a micro-spot on an optical disk. The 2-focus lens comprises a hologram lens which diffracts a part of the light beam and an object lens.

19 Claims, 19 Drawing Sheets

CORRECTION ELEMENTS TO LOWER LIGHT INTENSITY AROUND AN OPTICAL AXIS OF AN OPTICAL HEAD WITH A PLURALITY OF FOCAL POINTS

BACKGROUND OF THE INVENTION

1. Field of the Invention

The present invention relates to an optical head apparatus for recording, reproducing or erasing information to and from an optical medium such as an optical disk or an optical card.

2. Description of the Prior Art

Optical memory technology uses an optical disk having a bit pattern as a high density, high capacity storage medium, and it has been expanding its practical uses which include digital audio disks, video disks, document file disks and data files.

A mechanism which records or reproduces information to and from an optical disk with a light beam converted into a micro-spot with high reliability depends mainly on its optical system. The mechanism has an optical head apparatus as a main component. Basic functions of the optical head apparatus are divided mainly converging a light beam to form a micro-spot of diffraction limit, focusing and tracking control of the optical system, and detection of pit signals. These are realized by combining various optical system with various photoelectric conversion system according to an object and use of the optical head apparatus.

Recently, because a design of an optical system is improved and a diode laser as a light source which generates a light of shorter wavelength is fabricated, an optical disk with a higher density having a higher storage capacity has been developed. An approach for higher density is increase in numerical aperture (NA) on an optical disk of a optical system which converges a light beam to a micro-spot on an optical disk.

An increase in abberation due to inclination (so-called tilt) of an optical disk is a problem in this approach. That is, if numerical aperture is increased, abberation due to tilt is increased. This problem is prevented by decreasing the thickness of a substrate of an optical disk. For example, in order to have the same tolerance limit of abberation for an optical disk of NA=0.5 and thickness of 1.2 mm, the thickness is decreased to 0.6 mm for NA=0.6.

Then, it is desirable for a high density optical disk to have a smaller thickness. Thus, the thickness of a substrate of a higher density optical disk of next generation such as a digital versatile disk will be smaller than that of many prior art optical disks such as a compact disk (CD).

Therefore, it is desired to produce an optical disk drive which can record and reproduce both a prior art optical disk and a higher density optical disk of the next generation. Then, an optical head apparatus is necessary which converges a light beam of diffraction limit on optical disks having different thicknesses of substrate.

The inventors already proposed a light head which can be used with optical disks having different thicknesses of substrate (Japanese Patent Application No. 5-318230/1993). In the optical head, a light beam from a light source is collimated, and the beam is converged by a complex lens to a micro-spot on an optical disk. The light reflected by the optical disk returns the same optical path. Then, it is reflected by a beam splitter to be detected by a photosensor. A 2-focus lens comprising an object lens and a hologram lens which diffracts a part of the incident light is used for the optical head to form a converging spot of diffraction limit on optical disks having different thicknesses. The hologram lens has, for example, a concentric grating pattern in order to diffract a part of the incident beam, and a transmission light (or zeroth order diffraction light) also has a sufficient intensity. The light diffracted by the hologram lens and the other light not diffracted thereby are converged on different focus positions on an optical axis. Thus, a micro-spot can be formed on substrates of different thicknesses. Because the hologram lens functions as a lens, the positions of the two focuses are different on the optical axis from each other. When information is recorded or reproduced at one focus, the light beam converging on the other focus spreads largely to have a small optical intensity and it does not affect the recording or reproduction.

In the above-mentioned optical head apparatus using the two-focus lens has points to be improved or developed. For example, the 2-focus lens comprising an object lens and a hologram lens may have different structures.

In order to provide a compact optical head apparatus, a laser diode is desirable as the light source. However, the laser diode has a problem to be solved by the invention. As shown in FIG. 1, a laser diode emits a light beam from a point 2002 located near an end of an active layer 2001 of the laser diode. A far field image of the light beam has a diverging angle $\theta_X$ along X direction in parallel to the active layer 2001 narrower than a diverging angle $\theta_Y$ along Y direction perpendicular thereto. FIGS. 2A and 2B show optical intensity distribution of a light beam (of diameter $\phi$ of 4 mm) emitted by the laser diode and a light beam going out from a prior art hologram lens along X direction and along Y direction, respectively. The optical intensity distribution 2003 of the light beam emitted by the laser diode are different as described above.

As shown as hatched portions in FIGS. 2A and 2B, if the light beam is incident on the hologram lens, the optical intensity of the outgoing light becomes higher at the outer side than at the inner side. On the other hand, if the light beam is incident on the above-mentioned hologram lens which diffracts a part of the incident light, the optical intensity at the outer side becomes higher than that of the inner side. Because the diverging angle is wide in Y direction, the optical intensity at the outer side becomes higher especially in Y direction.

Next, an effect of side lobe of a light beam is explained. FIGS. 3A and 3B show results of calculation of optical intensity of diverging spot on a thin information medium in the X direction and in the Y direction when a hologram lens which diffracts a part of the incident light is used, wherein the maximum of a main lobe 380 is normalized as 100. The main lobe 380 is a necessary light for recording and reproduction, whereas a side lobe 381 is an unnecessary light which may deteriorate recording pit patterns or reproduced signals. The light intensity of the side lobe 381 is as low as about 1% in X direction, while it is about 4% in Y direction or it is somewhat high.

If the light intensity of the side lobe is about 4%, information can be read sufficiently. However, in order to read information stably against disturbances such as vibrations and temperature, it is desirable to decrease the lower lobe to decrease disadvantageous effects of the side lobe.

SUMMARY OF THE INVENTION

An object of the present invention is to provide a light head apparatus which can read information more stably by decreasing disadvantages of higher optical intensity at the outside of a light beam while converging the light beam on information media or optical disks having different thicknesses.

Another object of the present invention is to provide an improved optical head apparatus which can converge a light beam of diffraction limit on information media or optical disks having different thicknesses by using a hologram lens having sufficient intensity of transmission light.

A further object of the present invention is to provide a simple fabrication method of a correction element.

In one aspect of the invention of an optical head apparatus, a lens converges a light beam into a micro-spot on an information medium. One feature of the invention is that the lens has a plurality of focal points having different numerical apertures at the same side with respect to the lens. The lens comprises a combination of an object lens which refracts light and a hologram lens. Another feature of the invention is that a correction element changes optical intensity of the light beam. The correction element is provided in an optical path from the light source to the lens, and it has a portion distant from the optical axis where the optical intensity is lowered. The optical intensity is changed by providing a distribution of, for example, transmittance or zeroth order diffraction efficiency. The transmittance represents a ratio of light transmitting without being reflected or absorbed, while the zeroth order diffraction efficiency represents a ratio of light transmitting without being diffracted. The correction element has a grating in the portion thereof distant from the optical axis. Preferably, hypothetical contour curves along which the transmittance or the zeroth order diffraction efficiency have the same values of the correction element are convex with respect to a radial direction from the optical axis to an outer peripheral of the correction element. Preferably, the correction element further comprises a metallic film or a dielectric film in the portion distant from the optical axis.

In another aspect of the invention, an optical head apparatus comprises a correction element for correcting optical path length (wavefront) in an optical path from the light source to the lens. The correction element comprises a first portion distant from the optical axis in the second direction and a second portion around the optical axis having a height larger than the first portion.

In a further aspect of the invention, the hologram lens is integrated with a plane having a larger curvature of two planes of the object lens. A hologram lens may be integrated with a part of a plane of the object lens. Thus, a 2-focus lens can be formed simply.

In a still different aspect of the invention, a method is provided to fabricate a correction element which includes two first portions and a second portion between them, the first portions having a height smaller than the second portion. In the method, a mask on a transparent plate, and it is used to etching the plate on which the mask is not formed. Next, a metallic or dielectric film is formed on the plate, and the mask is removed. In a different method, a metallic or dielectric film is formed on a transparent plate, and a mask is formed on the metallic or dielectric film. Then, by using the mask, the metallic or dielectric film on which the mask is not formed is etched. Next, a transparent film is formed on the plate, and the mask is removed. In these methods, patterning is performed only once.

An advantage of the present invention is that an optical head apparatus can reproduce more stably by reducing side lobe of the converging spot.

Another advantage of the present invention is that disadvantages of astigmatic aberration can be reduced when a laser diode is used as a light source.

A third advantage of the invention is that the light beams has a good converging characteristic.

A fourth advantage of the invention is that the number of components of the optical head apparatus can be reduced.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 4:
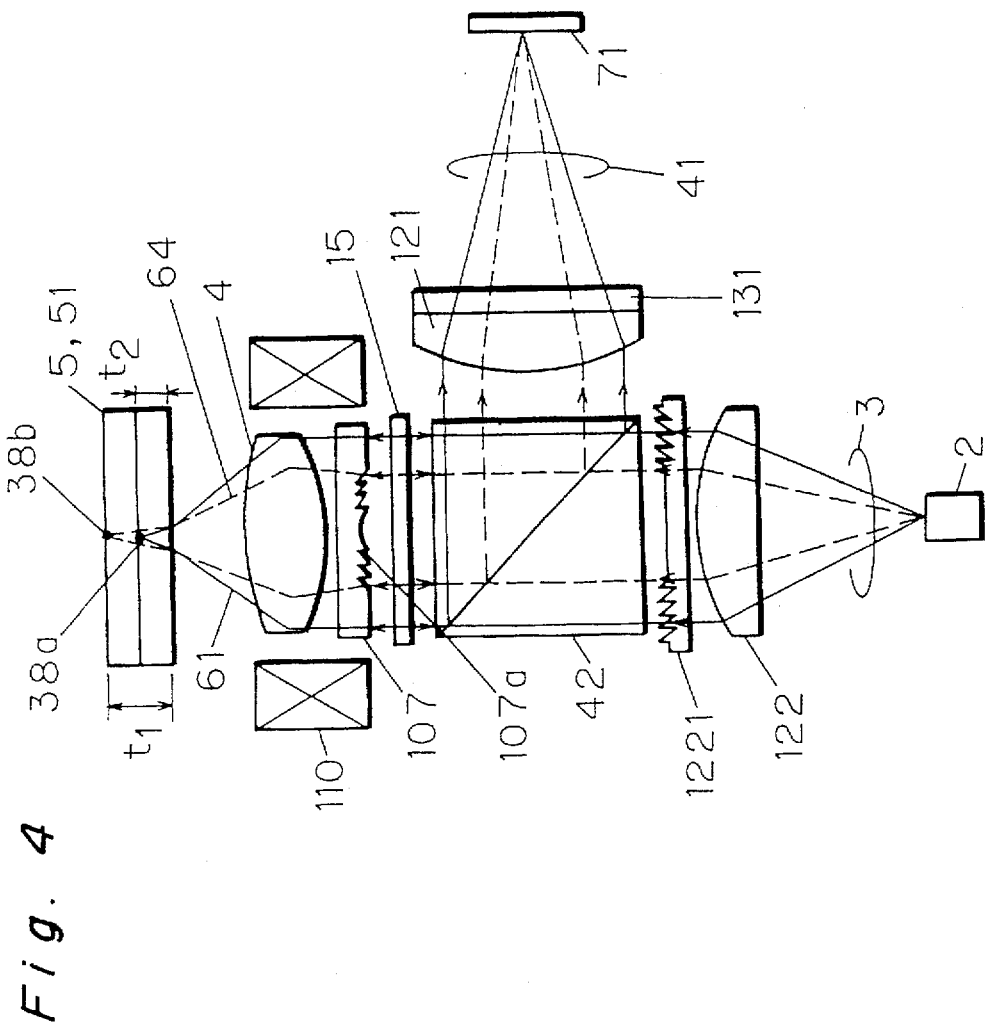
FIG. 4 is a schematic sectional view of an optical head apparatus.

Referring now to the drawings, wherein like reference characters designate like or corresponding parts throughout the views, FIG. 4 shows an optical head apparatus of a first embodiment of the invention. The optical head apparatus has features that a 2-focus lens consists of an object lens 4 and a hologram lens 107 and that a correction hologram element 1221 is provided to decrease a quantity of light at the outer side of a light beam.

In the optical head apparatus, a light beam emitted by a light source such as a laser diode is collimated generally by a collimating lens 122 and propagates through a correction hologram element 1221 so that a quantity of light is decreased at the outer side thereof. The correction element 1221 is provided in an optical path from the light source 2 to the hologram lens 107. It has a characteristic distribution of transmittance or zeroth order diffraction efficiency wherein a transmittance or zeroth order diffraction efficiency at a portion thereof distant from an optical axis is smaller than that at another portion thereof around the optical path. The light beam on which the optical intensity is decreased at the outside transmits a polarized beam splitter 42 and is polarized circularly by a ¼ wavelength plate 15. Next, the light beam enters the hologram lens 107 and the object lens 4. A combination of the hologram lens 107 and the object lens 4 forms a 2-focus lens, and it converges the light beam on a thick information medium 5 or on a thin information medium 51. The information medium 5 such as a compact disk has a substrate thickness t1 of 1.2 mm, while the information medium 51 such as a digital versatile disk has a substrate thickness t2 of 0.6 mm smaller than t1. The substrate thickness is defined as a thickness from an incident surface on which a light beam enters to an information recording layer of an information medium or optical disk. The term "converging" is defined in that a diverging or collimated light is converted to a micro-spot of diffraction limit.

Figure 5:
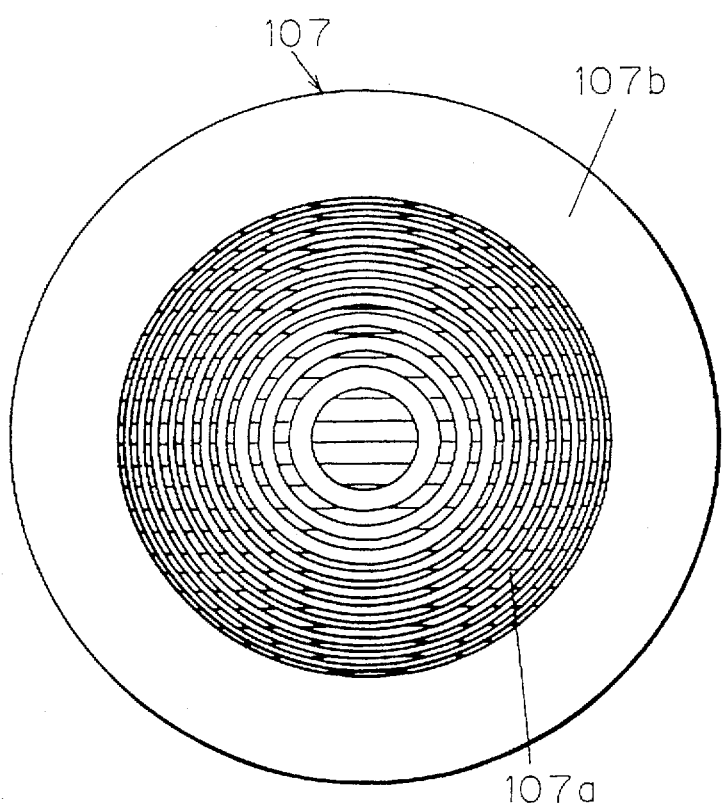
FIG. 5 is a schematic plan view of a hologram pattern of a hologram lens.
Figure 6:
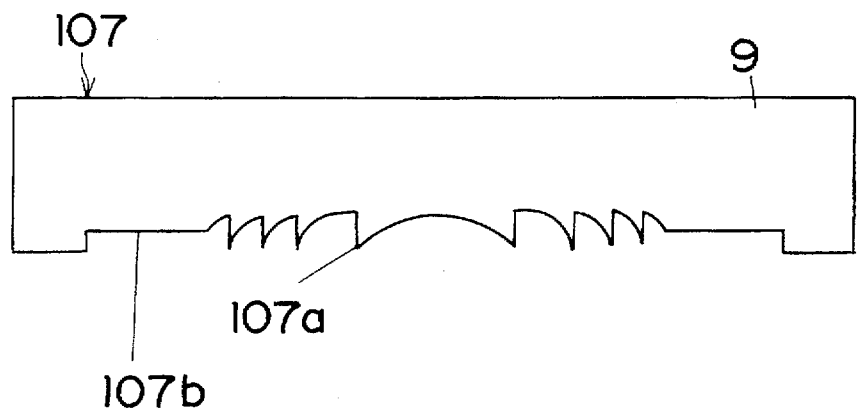
FIG. 6 is a schematic sectional view of the hologram lens.

As shown schematically in FIGS. 5 and 6, the hologram lens 107 has a concentric grating pattern 107a formed on a plate transparent with respect to the light beam 3 and another region 107b having no grating pattern. The grating pattern 107a is formed within a diameter smaller than an aperture determined by the object lens 4. A center or an optical axis of the grating pattern 107a agrees with that of the object lens 4 within a tolerance of construction.

Figure 7:
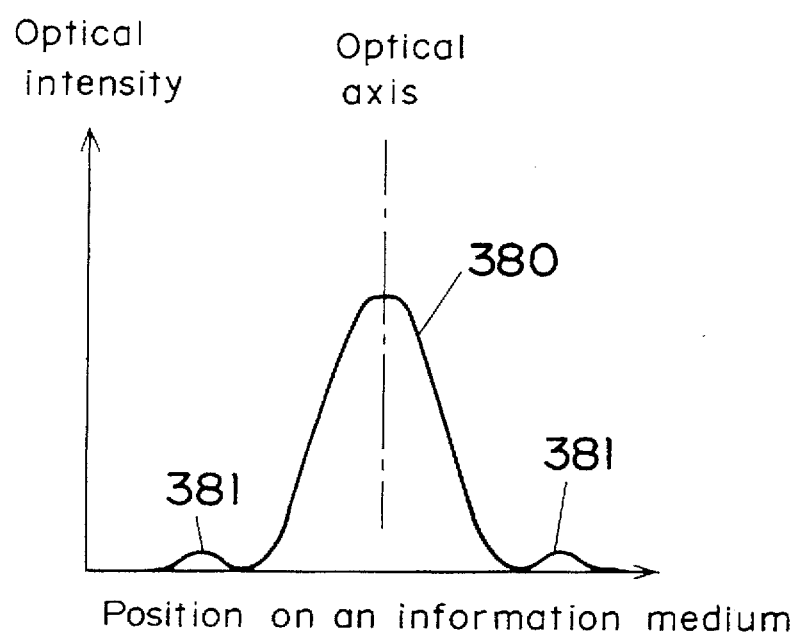
FIG. 7 is a graph of optical intensity distribution of a converging spot on an information medium.

The hologram lens 107 is designed so that the diffraction efficiency of +1-st order diffraction beam is less than 100% and that a transmission light (zeroth order diffraction beam) 61a also has a sufficient amplitude. If the hologram lens 107 is formed to have uneven relief pattern as shown in FIG. 4, this can be realized easily, for example, by making the height h of the relief type uneven pattern smaller than $\lambda/(n-1)$ where $\lambda$ designates the wavelength of the light beam 3 and n designates an index of refraction of the transparent plate of the hologram lens 107, or by making a phase shift at the grating portion 107a smaller than $2\pi$. Thus, the transmission light has a sufficient amplitude at any portion in the hologram lens 107, so that a side lobe of the converging beam of the transmission light on the optical disk 5, 51 can be suppressed advantageously as shown in FIG. 7 illustrating a distribution of optical amplitude of the converging beam.

As mentioned above, the hologram lens 107 consists of the grating pattern 107a and the region 107b which has no grating pattern. The phase of the zeroth order diffraction light (transmission light) of the grating pattern 107a has an average of phase modulations generated by the grating pattern 107a. A converging performance can be improved by making the phase of the region 107b about equal to that of the zeroth order diffraction light. Then, if the grating pattern 107a of the hologram lens is a relief type, as shown in FIG. 6, the height of the surface of the region 107b having no grating is matched to an average level of the unevenness of the grating pattern.

The light beam reflected by the information medium 5 or 51 returns the same optical path. That is, the transmission light 61 transmits again the hologram lens 107 as shown with solid lines, while the +1-st order diffraction light 64 is diffracted by the hologram lens 107 again as +1-st order diffraction light. Both propagate through the same optical paths after they have transmitted the polarized beam splitter 42 first and are reflected by the polarized beam splitter 42. The reflected light is converged by a converging lens 121 and its wavefront is converted by a wavefront conversion means such as a cylindrical lens 131 to obtain servo signals such as focus error signals and tracking error signals. Then, the light enters into a photosensor 71. By operating output signals of the photosensor 71, servo signals and information signals can be obtained.

The hologram lens 107 may be blazed as shown, for example, in FIG. 4. Then, a sum of quantities of the transmission light and of the +1-st order diffraction light for forming a light beam of two focuses can be increased, and an efficiency of utilizing the light can be enhanced.

Figures 8A, 8B:
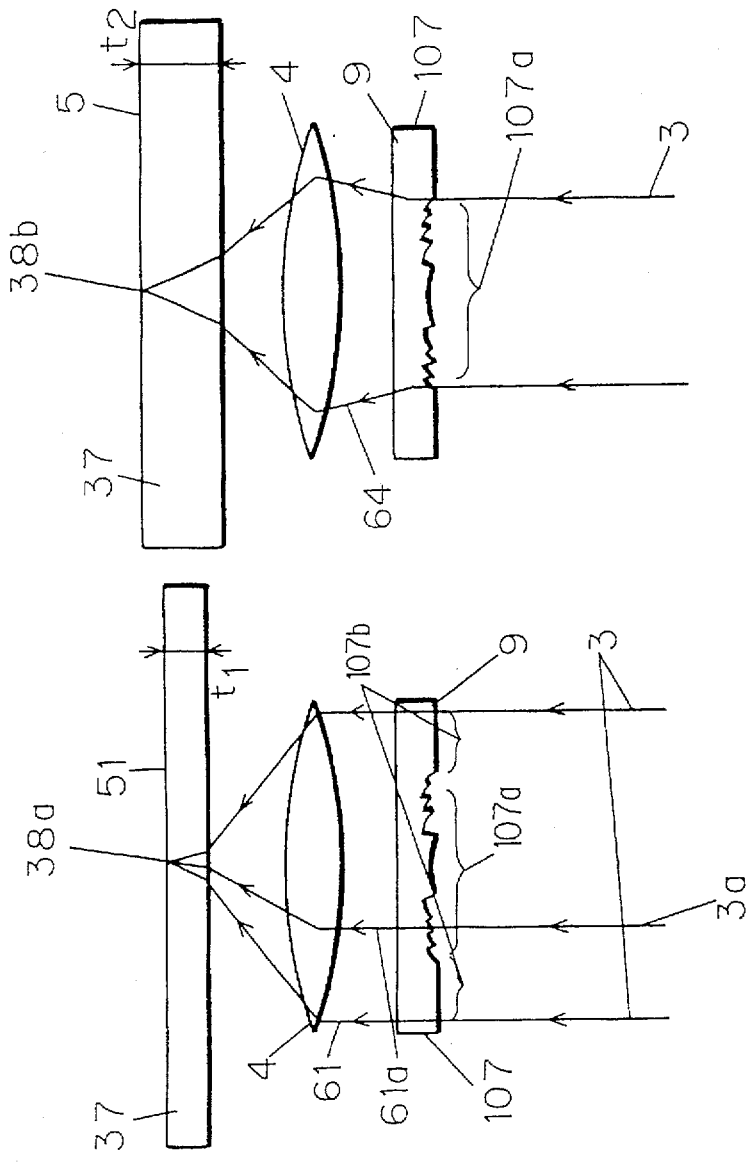
FIGS. 8A and 8B are sectional views of a complex object lens for explaining a converging situation of transmission light at two focal points when the transmission light transmits the grating pattern and the other region of a hologram lens and when the transmission light transmits the only grating pattern of the hologram lens.

As shown in FIG. 8A, the object lens 4 is designed so that a converging spot 38a of diffraction limit is formed on a thin optical disk 51 having NA of 0.6 or higher and substrate thickness t2 when the light beam 61 which transmits the hologram lens 107 without diffraction enters the object lens 4. Because the grating pattern 107a is formed within a diameter which is smaller than an aperture determined by the object lens 4, no diffraction occurs in the region 107b having no grating pattern. Then, a quantity of light of the converging light 38a of higher numerical aperture becomes large.

On the other hand, as shown in FIG. 8B, a converging spot 38b of diffraction limit can be formed on a thick optical disk 5 having a low NA of 0.5 and substrate thickness t1. The +1-st order diffraction light 64 diffracted by the hologram lens 107 is converged by the object lens 4 onto the information medium 5. Abberation correction is performed by the hologram lens 107 on the +1-st order diffraction light 64 so that it is converged to diffraction limit through the substrate 37 having substrate thickness t1. The hologram lens 107 having abberation correction is designed by calculating an interference pattern (grating pattern 107a of the hologram lens 107) between two light beams. One of the two beams is generated by dispersing spherical waves from the converging spot 38a and by transmitting successively the substrate 37 having thickness t1, the object lens 4 and the transparent plate 9 of the hologram lens 107, while the other is a beam having phases reversed as to the sign shown in FIG. 8B. Then, the hologram lens 107 can be fabricated easily by using, for example, computer generated hologram (CGH).

Thus, by combining the hologram lens 107 which diffracts a part of the incident light and the object lens 4, a spot converted to diffraction limit can be formed on optical disks having different substrate thicknesses (t1 and t2), or a 2-focus lens can be provided.

Because the hologram lens 107 functions as a lens, the two focuses are located at different positions along the optical axis. Therefore, when information is recorded or reproduced in one of the focal spots, a light beam having the other focal point as the converging point spreads widely. Thus, the optical intensity thereof is small, and it does not affect recording and reproduction. For example, when the converging spot 38a is located at a focal point for the information medium 51, as shown in FIG. 8A, the +1-st order diffraction light 64 spreads widely on the information recording plane of the information medium 51, and it does not affect recording and reproduction. A similar situation is also observed in FIG. 8B.

It is preferable that a distance between the two focuses is set to be 50 μm or larger as much as possible so that when information is recorded or reproduced at one of the focal spots, a light beam having the converging point at the other focus diverges widely on the information recording plane of the medium 51 to decrease optical intensity so as not to affect recording or reproduction. The substrate thickness t1 of a compact disk or a laser disk is 1.2 mm, while it is considered that the substrate thickness t2 of a high density optical disk is suitably 0.4–0.8 mm. Then, it is preferable that a distance between the two focal positions does not exceed largely from the difference of about 0.8 mm between t1 and t2, by taking into account the movable range of an actuator used for focus serve of the object lens 4. Therefore, when a focal distance of the converging spot 38a for the thin substrate having a high numerical aperture is shortened as shown in FIG. 8A, the distance between the two focal points is set between 50 μm and 1 mm.

The object lens 4 is designed so that a micro-spot of diffraction limit can be formed on the thin optical disk of substrate thickness t2 when the light beam 62 transmitting the hologram lens 107 without diffracted is incident, as shown in FIG. 4. Further, the grating pattern of the hologram lens 107 is formed within a diameter smaller than an aperture determined by the object lens 4, as shown in FIG. 5. Therefore, no diffraction occurs at the region 107b with no grating pattern.

As described above, by combining the hologram lens 107 which diffracts a part of incident light with the object lens 4, a 2-focus lens can be provided which can form converging spot converged to diffraction limit on optical disks having different substrate thicknesses t1 and t2.

The transmission light 61 reflected by the medium 5, 51 transmits again the hologram lens 107 and the +1-st order diffraction light 64 reflected by the medium 5, 51 is diffracted again by the hologram lens 107 as +1-st order diffraction light. The transmission light 61 and the +1-st order diffraction light 64 are reflected by the beam splitter 42 and condensed by a converging lens 121. Servo signals are detected with the photosensor 71 by using the converged light beam. Therefore, the converging point 39 of the reflected light beam on the photosensor 71 agrees with the emitting point of the light source 2 in the sense that they have a relation of conjugate point. Therefore, a single photosensor can be used both as a detector of servo signals and as a detector of information signals. Thus, a single optical head apparatus can record and reproduce signals to and from optical disks of different thicknesses though it is compact and comprises a small number of components. Further, it is light weight and can be fabricated with a low cost.

Focus error signals can be detected with spot size detection method (Japanese Patent laid open Publication 2-185722/1990), astigmatic method, knife edge method or the like. Tracking error signals are detected by push-pull method, heterodyne method, three beam method or the like.

Figures 9A, 9B:
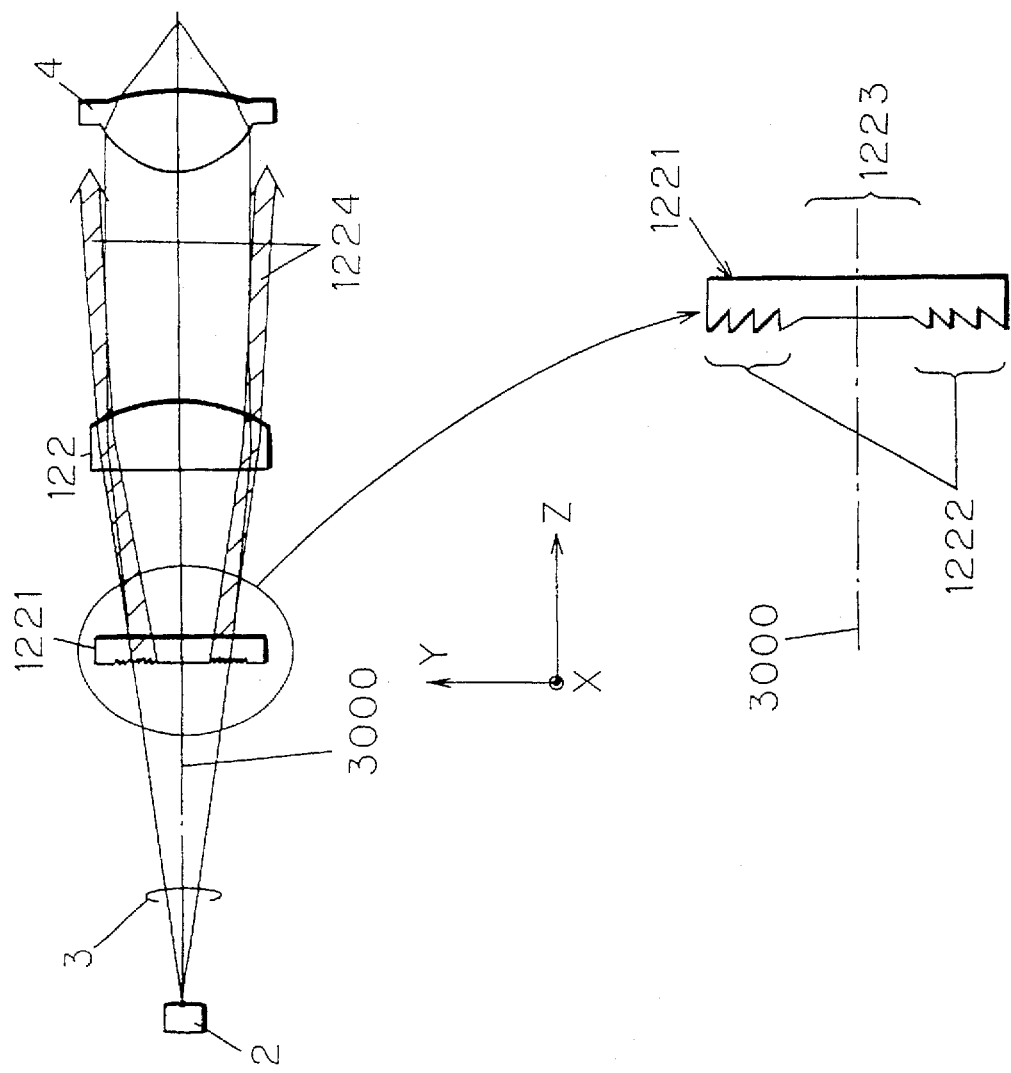
FIG. 9A is a diagram for explaining an operation of a correction hologram element.
FIG. 9B is a schematic sectional view of the correction hologram element.

The correction hologram element 1221 is one of the features of the invention. FIG. 9A shows an optical system from the light source 2 to the object lens 4. FIG. 9B shows an example of the correction hologram element 1221, which comprises a transmission region 1223 which transmits all the light near the optical axis 3000 and a grating 1222 at a region off the optical axis 3000. As shown in FIG. 9A, when the light beam is emitted from the light source 2, the correction hologram element 1221 transmits all the light around the optical axis 3000 while it diffracts a part of the light beam off the optical axis 3000, as shown with hatching. Thus, the transmittance is decreased off the optical axis 3000.

The phase of the zeroth order diffraction light (transmission light) generated by the grating 1222 has an average of phase modulation by the grating 1222. Then, in order to improve conversion efficiency of the object lens 4, it is preferable to match the phase of the zeroth order diffraction light at the grating 1222 with that of the transmission light at the transmission region 1223. Then, if the correction hologram element 1221 is a relief type as shown in FIG. 9B, the average of the unevenness of the grating 1222 is matched with the height of the transmission region 1223.

Figure 10:
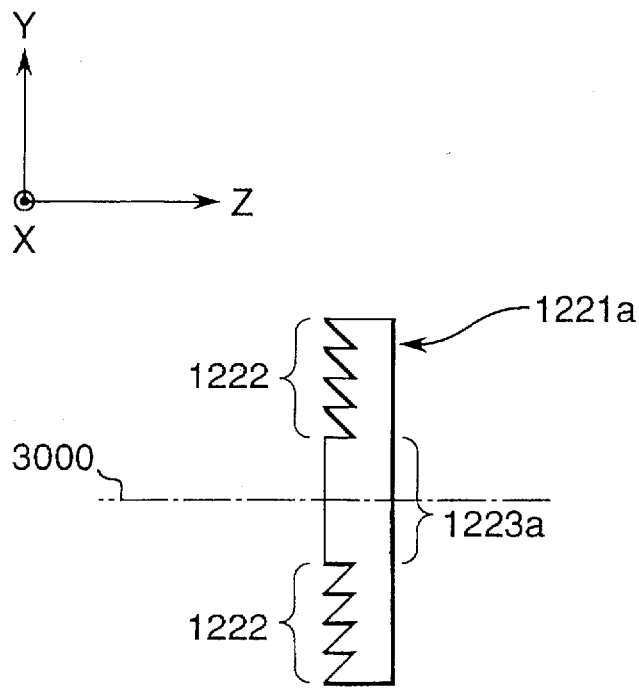
FIG. 10 is a schematic sectional view of a light head apparatus including a correction hologram element.

However, if the light source 2 comprises a laser diode and the laser diode has an astigmatic aberration (refer to FIG. 4), a correction hologram element 1221a shown in FIG. 10 is used. The element 1221a also comprises a transmission region 1223a which transmits all the light near the optical axis 3000 and a grating 1222 at a region off the optical axis 3000. The height of the surface of the transmission region 1223a is set to be larger than the average of the unevenness of the grating 1222. In other words, the thickness of the transmission region 1223a is larger than that of the grating 1222. Thus, a disadvantage of astigmatic aberration of the laser diode is decreased, and converging performance of the optical system can be improved. If the laser diode has astigmatic aberration, the converging point in a plane in a direction having a narrower diverging angle of the emitting light enters into the active layer. The two converging points can be matched in the two directions by enhancing convex lens action of the optical system in a direction having a wider diverging angle. Thus, wavefront aberration can be decreased. As will be explained later, it is preferable that the Y direction of the correction hologram element 1221a matches with the direction having a wider diverging angle. Then, it is desirable that the convex lens action is performed in Y direction. This is the reason why the transmission region 1223a is thick.

The diffracted light 1224 diffracted by the correction hologram element 1221 becomes unnecessary stray light. Then, it is desirable that the diffracted light does not enter in the aperture of the object lens 4, or that it does not enter into the photosensor 71.

In order to prevent the stray light from entering into the aperture of the object lens 4, the pitch of the grating 1222 is preferably 5 μm or less, more preferably 2 μm or less. In a different way, after the grating 1222 is blazed in a direction along which the optical intensity of the diffracted light increases as the position departs from the optical axis, the pitch of the grating 1222 is preferably 20 μm or less, more preferably 12 μm or less.

In a different way, in order to prevent the stray light from entering into the photosensor 71 after being reflected by the medium 5, 51, the pitch of the grating 1222 is preferably 30 μm or less, more preferably 10 μm or less.

It is possible to detect tracking error signals with the three-beam method from output signals of the photosensor 71 obtained by detecting the light reflected from the medium 5, 51. In this case, it is preferable that the grating 1222 of the correction hologram element 1221 is blazed in a direction along which the optical intensity of diffracted light increases as the position approaches to the optical axis.

Figure 1:
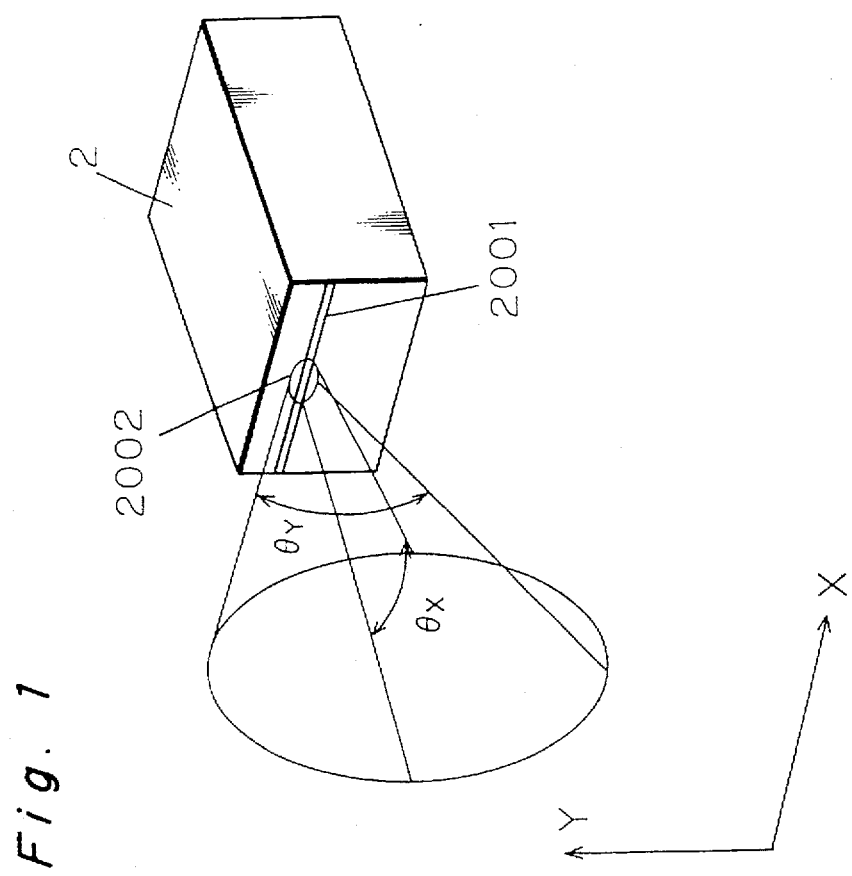
FIG. 1 is a perspective view of a laser diode for illustrating dispersion of a light beam emitted by the laser diode.
Figure 11:
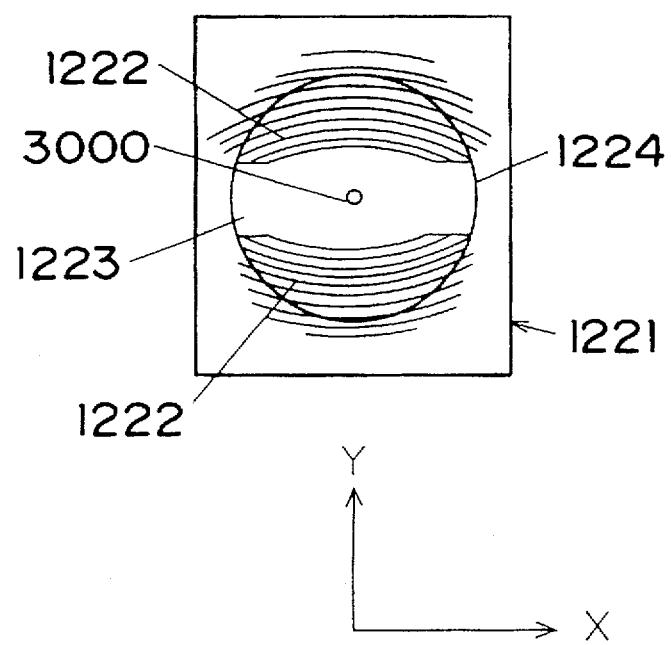
FIG. 11 is a sectional view of the correction hologram element.

FIG. 11 shows an example of the correction hologram element 1221 observed along the optical axis or the Z-axis in FIGS. 9A and 9B. Marks shown on the optical axis 3000 and on an effective light beam 1224 are illustrated for explanation, and they are not formed actually in the correction hologram element 1221. The coordinate axes are common to FIGS. 1 and 9. In order to decrease a quantity of light along the Y-direction as the position departs from the optical axis, or along the direction having a wider diverging angle of the light beam, it is preferable that the grating 1222 is formed in portions off the optical axis in the Y-direction.

Further, because contour lines of optical intensity of far field pattern (FFP) are elliptical, the light can be used efficiently by making a boundary between the grating 1222 and the transmission region 1223 convex towards the outside.

Figure 12:
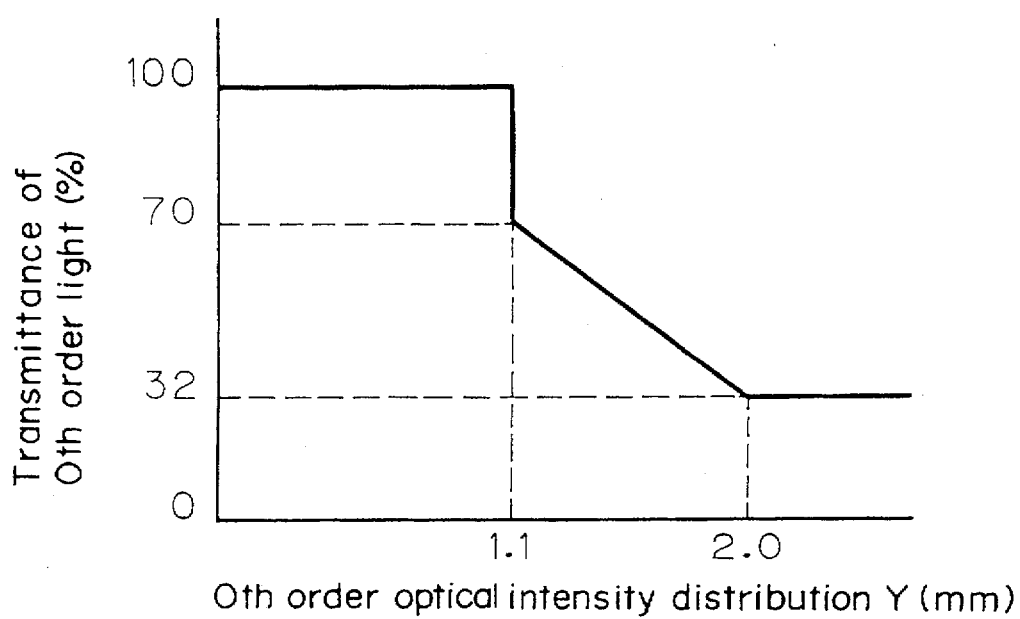
FIG. 12 is a graph of the zeroth order light transmittance plotted against a distance from the optical axis in the Y-direction.

FIG. 12 shows an example of a change in zeroth order diffraction efficiency (transmittance) of the correction hologram element 1221 in the Y-direction. The origin is a cross point of the optical axis 3000 with the correction hologram element 1221. The transmittance is decreased as the distance from the optical axis increases. It is constant in the transmission region 1223, and it decreases in the grating 1222.

Figure 13B:
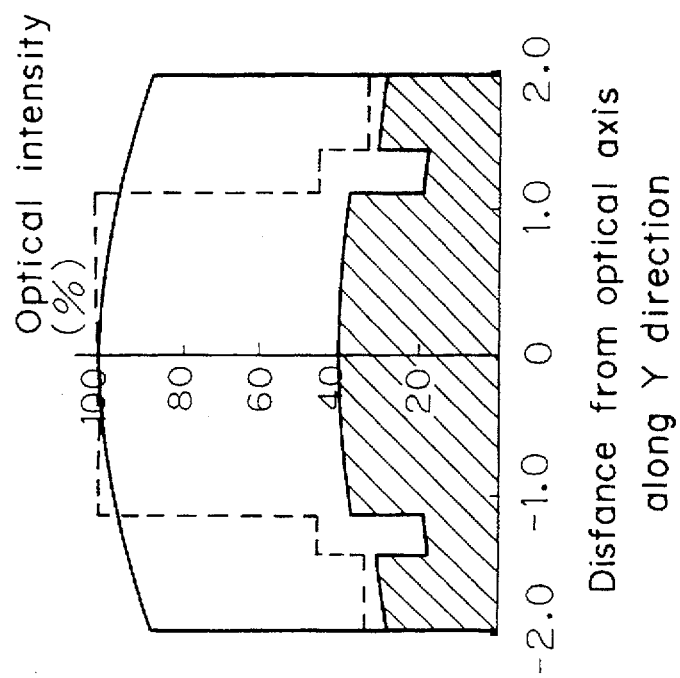
FIGS. 13A and 13B are graphs on distribution of quantity of light of a converging spot of light beam on an information medium along the X-direction and along the Y-direction, respectively, when a correction hologram element is used.
Figure 13A:
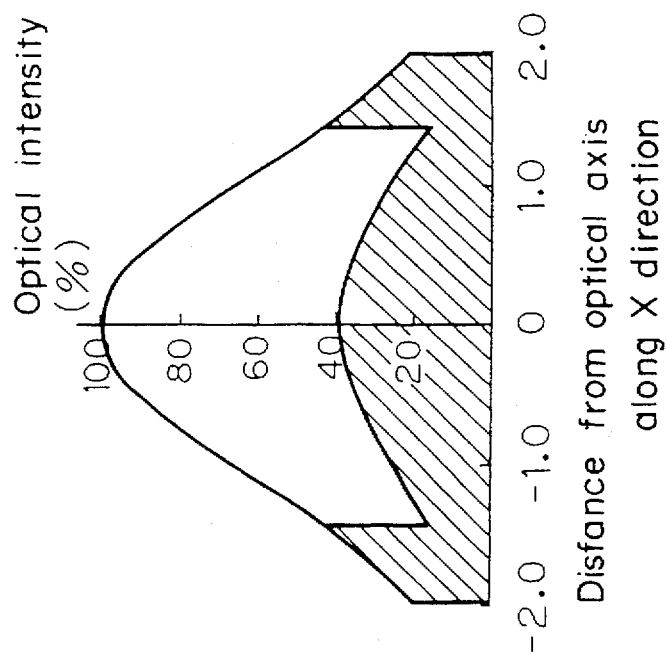

By using the correction hologram element 1221, far field pattern of the light beam transmitting the hologram lens 107 is changed as shown in FIGS. 13A and 13B which show distribution of optical intensity in the X-direction and in the Y-direction, respectively. By decreasing the optical intensity in the Y-direction by the correction hologram element 1221, the distribution of optical intensity in the Y-direction, shown in FIG. 13B, becomes different from that shown in FIG. 2. That is, the optical intensity at the outside in the Y-direction becomes lower than at the inside.

In order to decrease the optical intensity at the outside than at the inside, it is preferable that the zeroth order diffraction efficiency of the grating 1222 of the correction hologram element 1221 is smaller than that of the hologram lens 170.

A dashed line in FIG. 13B shows a distribution of the zeroth order diffraction efficiency of the correction hologram element 1221 which is used for calculating the far field pattern, and it is a little different from that of the example shown in FIG. 12.

Figure 14A:
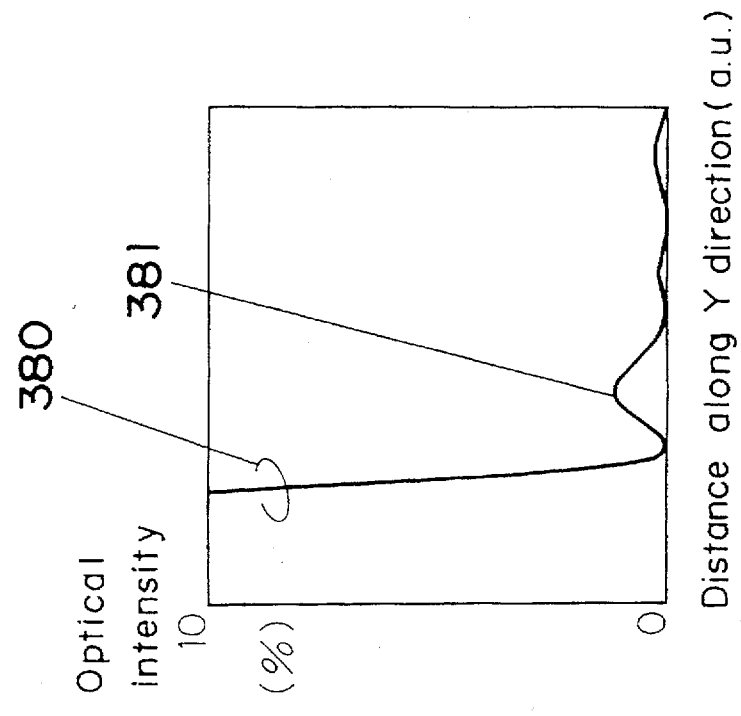
FIGS. 14A and 14B are graphs on distribution of quantity of light of light beam on an optical disk along the X-direction and along the Y-direction, respectively.
Figure 14B:
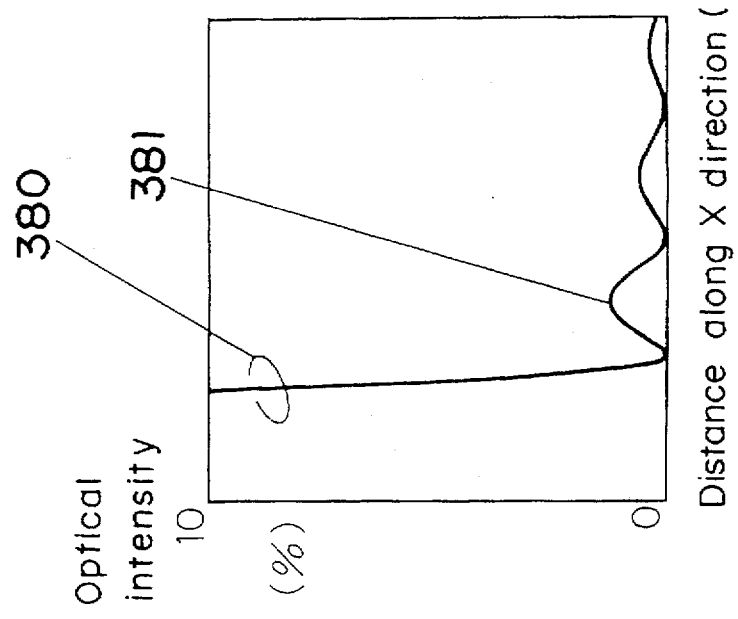
Figure 15:
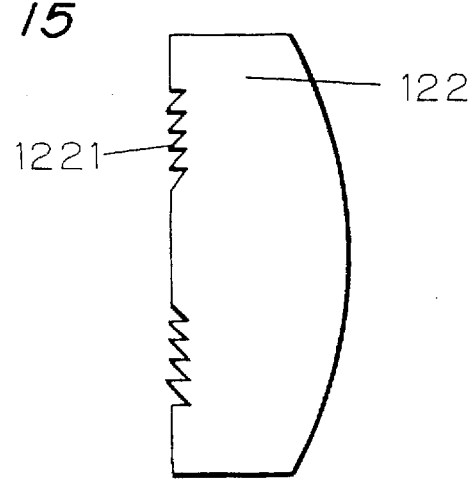
FIG. 15 is a sectional view of a collimating lens having a correction hologram.

FIGS. 14A and 14B show results of a calculation of a profile of a converging spot on the information medium 51 in the X-direction and in the Y-direction, respectively. In the two directions, the height of the side lobe 381 is as low as 1% of the main lobe 380. In other words, the side lobe of the light beam (converging spot) on information media becomes lower, and reproduction signals of superior characteristics can be obtained.

Further, if the collimating lens 122 is used in the optical system, a correction hologram 1221a may be formed on the collimating lens 122 at the peripheral region of a surface thereof. Then, a number of the components of the optical system is decreased, and the light head apparatus can be fabricated at a lower cost.

In the above-mentioned embodiments, the correction hologram element is a relief type. However, a correction hologram element of phase modulation type can be fabricated similarly by using a lithium niobate plate a part of which is exchanged partly with protons (refer to Japanese Patent laid open Publications 61-189504/1986 and 63-241735/1988) or by using a liquid crystal cell.

Figure 17:
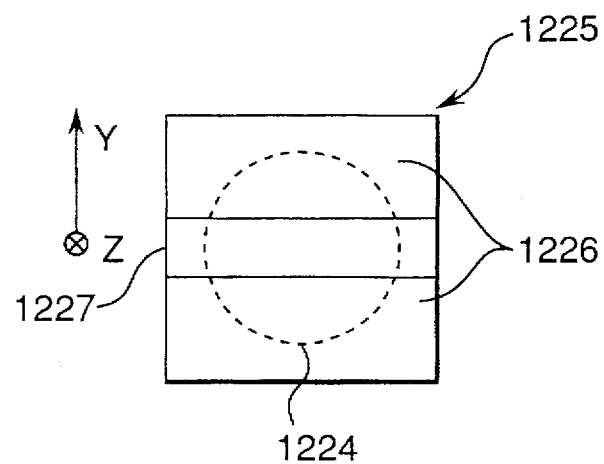
FIG. 17 is a schematic plan view of a correction filter.
Figure 16:
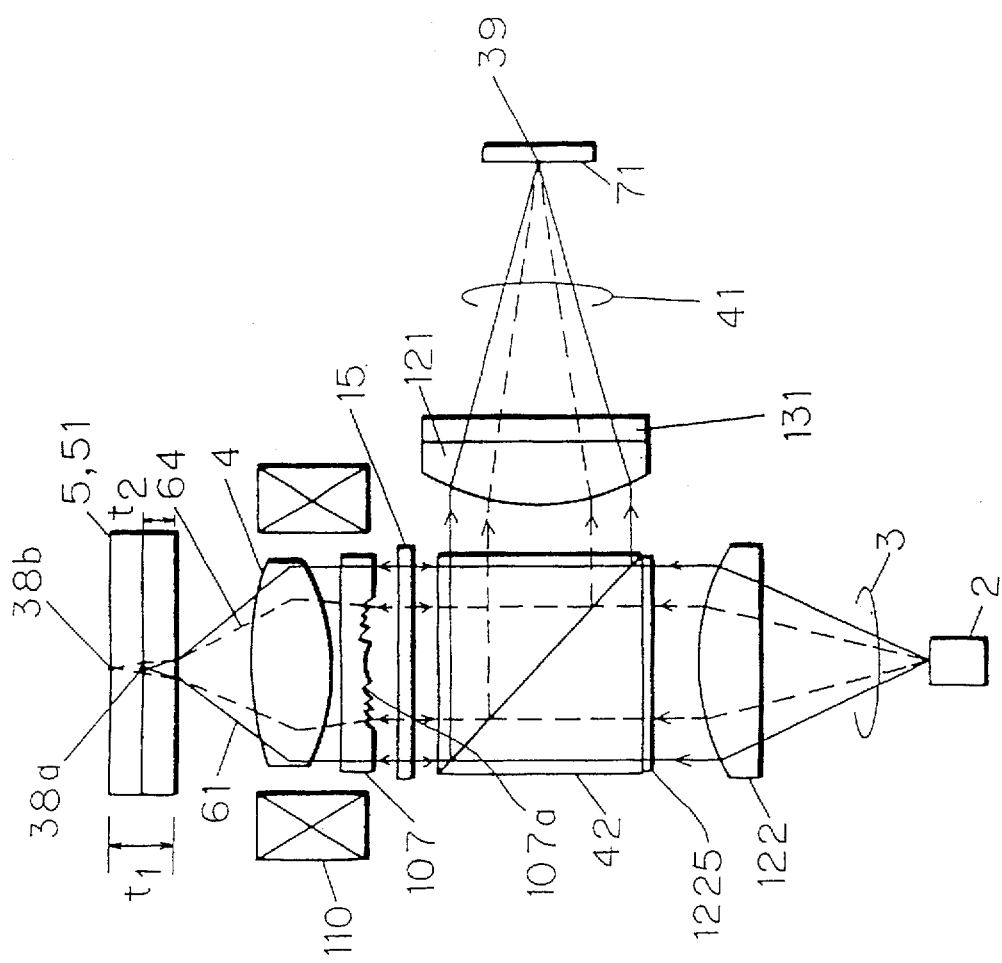
FIG. 16 is a schematic sectional view of a light head apparatus of a different embodiment.

In the correction hologram element explained above, the grating 1222 is provided to decrease the transmittance. However, the light comprises components of optical intensity and phase, and an element which modulates optical intensity or phase may be used instead of the grating. Then, a metallic film or a dielectric film may be used instead of the grating. For example, as shown in FIG. 16, a correction filter 1225 shown in FIG. 17 is formed directly on the polarized beam splitter 42 instead of the correction hologram element 1221. The X and Z axes shown in FIGS. 16 and 17 are common. The correction filter 1225 comprises two portions 1226 made of a metallic or dielectric film for decreasing transmittance at two sides and a transmission portion 1226 between them which transmits the light beam. As shown with a dashed circle in FIG. 17, an effective diameter of the light beam 1224 is larger than the width of the transmission portion 1226. By forming the correction filter directly on the beam splitter 42, the number of the components of the optical system is decreased. Further, a number of the planes of the optical components can be decreased, and a loss due to reflection at the planes can be decreased. As the metallic film, a chromium film or the like which is stable is preferable.

Figure 18:
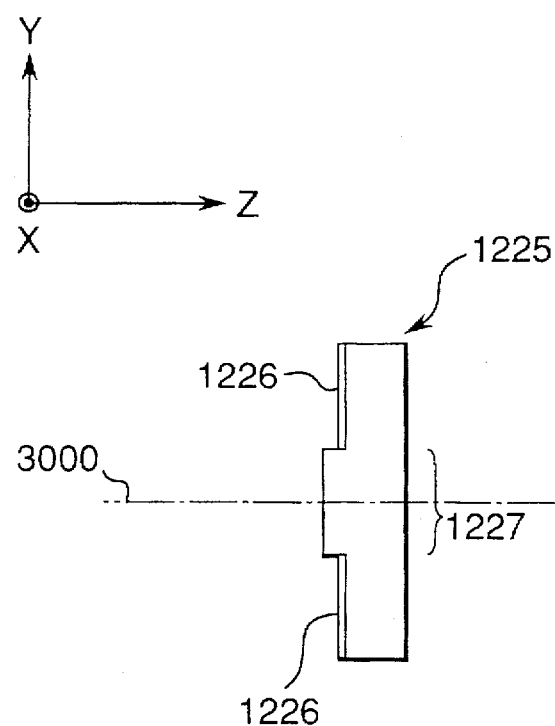
FIG. 18 is a schematic sectional view of a correction filter.

In a modified example, portions for decreasing transmittance can be formed on a surface of the collimating lens 122 instead of the beam splitter. The transmittance of the laser beam can also be decreased at the outside in the example. It is preferable that a normal of the surface of the correction filter is inclined with respect to the optical axis in order for the reflected light to enter into the laser diode to cause noises. Especially, if the correction filter 1225 is provided on the surface of the beam splitter 42, as shown in FIG. 16, the beam splitter 42 is inclined. Further, if the transmission portion 1227 of the correction filter 1225 is fabricated thick as shown in FIG. 18 to increase the optical path, disadvantages of astigmatic aberration of the laser diode can be eliminated, similarly to the correction hologram element explained above.

Figure 2B:
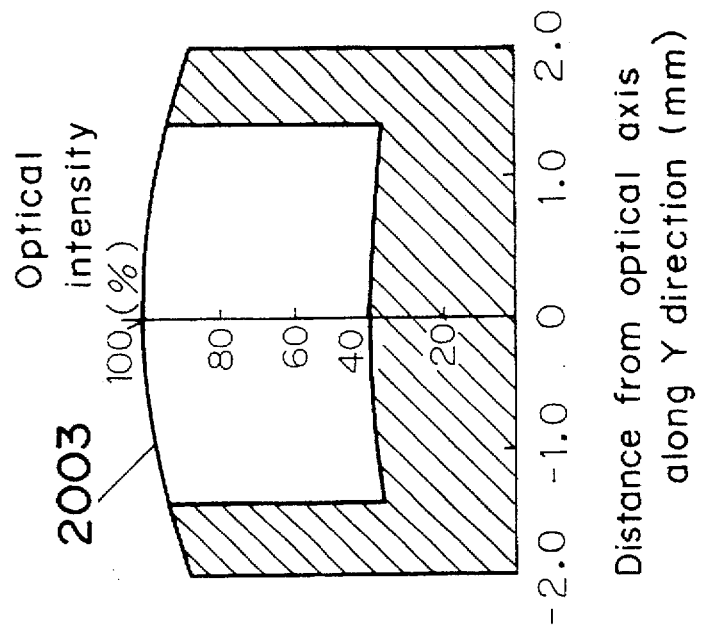
FIGS. 2A and 2B are graphs on distribution of quantity of a light of light beam along the X-direction and along the Y-direction, respectively.
Figure 2A:
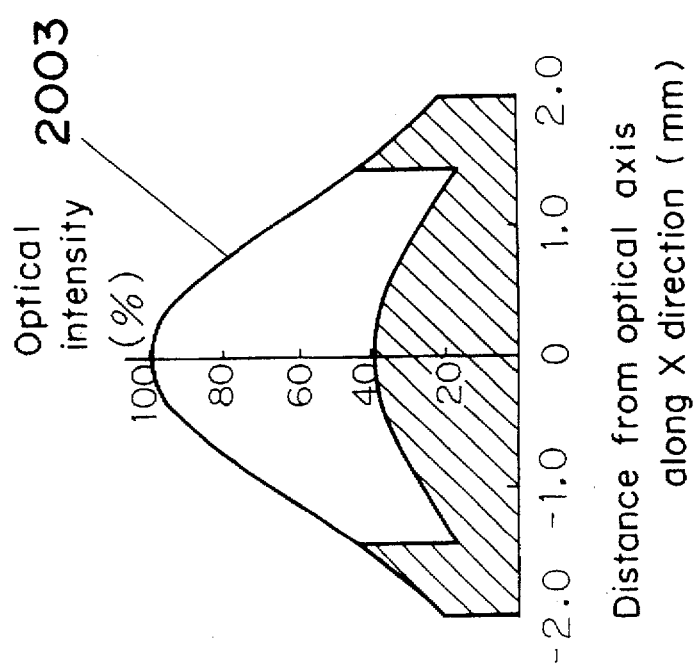
Figure 3A:
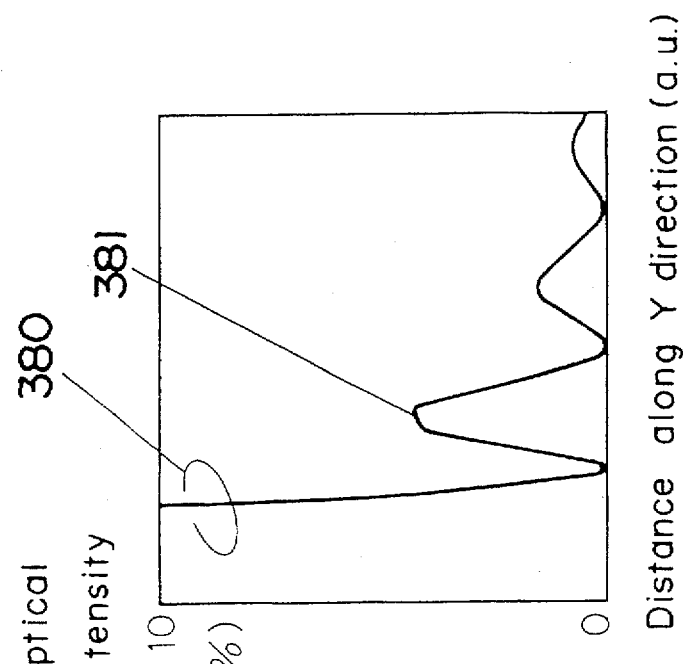
FIGS. 3A and 3B are graphs on distribution of quantity of light of a converging spot of light beam on an information medium along the X direction and along the Y direction, respectively.
Figure 3B:
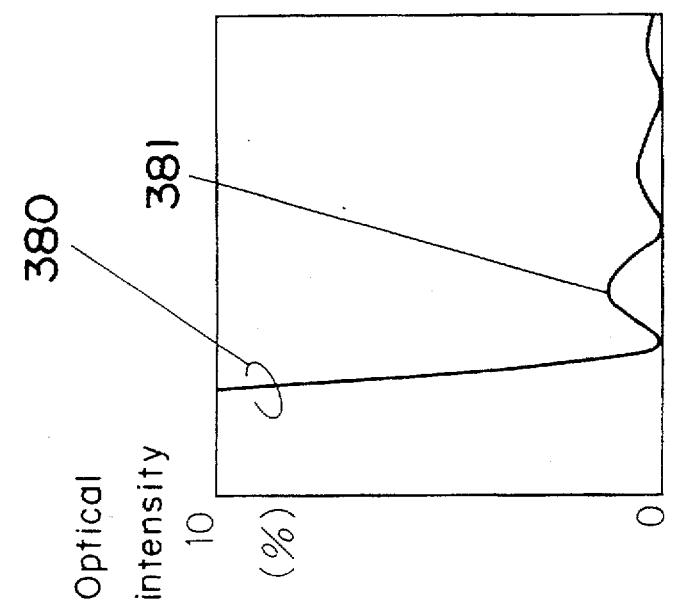

Japanese Patent laid open Publications 56-85944/1987 and 62-67737/1987 describes elements which are similar in some aspects to the correction hologram element or the correction filter of the above-mentioned embodiments. In the former, an element for decreasing radiation comprises a transparent central portion and side portions absorbing or reflecting light is provided in an optical path, and the element decreases radiation amplitude at the side portions in order to decrease a stroke due to tilt of optical axis. In the latter, a light division means is provided in the optical path in order to form two subbeams besides a main beam. In order to decrease cross talk due to side lobe, the light division means makes the optical intensity distribution of the main beam at its periphery. However, the prior art optical systems decrease optical intensity at a periphery of a normal light beam than that of the central portion thereof to decrease the side lobe of the light beam. On the contrary, the present invention intends to solve a problem characteristic of an optical system using a 2-focus lens which uses a hologram lens 107 which diffracts a part of the incident light. In such an optical system, as shown in FIG. 2B, the distribution of the optical intensity is large especially at the outside in the Y-direction, and this may make it too unstable to read information. Then, by using the correction hologram or the correction filter, the distribution of optical intensity is returned to an ordinary, flat distribution of light beam. Thus, the embodiment has remarkable advantages in that the side lobe can be decreased largely and that a light beam which can be used for different substrate thicknesses is formed by a single lens.

Figure 19:
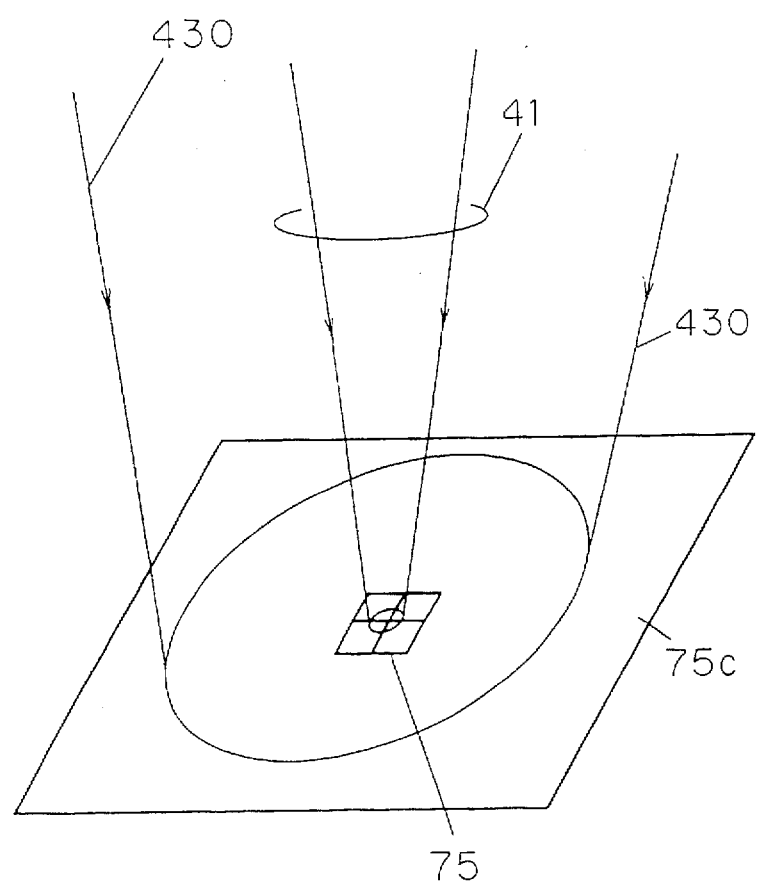
FIG. 19 is a schematic perspective view for illustrating distribution of light on a photosensor.

As shown in FIG. 19, in the optical head apparatus, a part of the light which is converged on the recording plane of the optical disk to read signals spreads largely on the photosensor. For example, when information is reproduced from the information medium 51 (substrate thickness t2) with the optical head apparatus which uses the hologram lens 107, the light converged on the recording plane of the optical disk propagates again through the hologram lens 107, and it is detected by the photosensor to read servo signals and information signals. When the light converged on the recording plane of the optical disk is diffracted by the hologram lens 107, it spreads widely as the 1-st order diffraction light 430 as shown in FIG. 19. Then, another large photosensor 75c (preferably of a diameter equal to or larger than 1 mm) is provided around the photosensor 75 for detecting serve signals in order to detect the widely spread light. Then, a sum of the outputs of the photosensor 75 and the another sensor 75c is used as information signals. Then, an S/N ratio is increased further, and frequency characteristic can also be improved.

Figure 20:
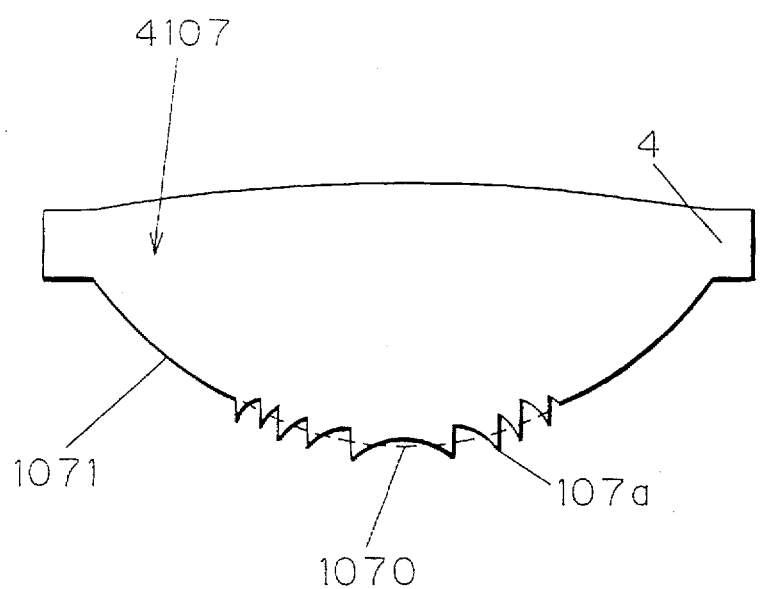
FIG. 20 is a schematic sectional view of a complex lens.

The object lens used in the above-mentioned embodiment comprises basically a combination of the object lens 4 which refracts light and the hologram lens 107. The object lens and the hologram lens can be connected to each other, for example, with a packaging means or they can be integrated with each other, for example, by forming the grating of the hologram lens on the object lens 4, as shown in FIG. 20. Then, a shift of optical axis between the hologram lens and the object lens can be decreased. The off-axis aberration of the +1-st order diffraction light of the hologram lens can be reduced. The optical head apparatus has a lighter weight and a lower cost.

If the hologram lens is designed to be tilted from the optical axis to cause aberration, as shown in FIG. 20, the grating of the hologram lens 107a is formed on a plane having a larger curvature or a smaller curvature radius, or on a plane not opposing the optical disk. Thus, aberration from the optical axis of the hologram lens can be suppressed.

The phase of the zeroth order diffraction light (transmission light) of the grating 107a shown in FIG. 20 is an average of phase modulation provided by the grating 107a. Therefore, an average plane 1070 of the unevenness of the grating 107a, displayed with a dashed line, is formed to be continuous to a surface of the plane 1071 having no grating. Further, the average plane 1070 of the grating 107a and the surface of the plane 1070 having no grating are designed to converge the light beam to diffraction limit through the substrate thickness t2 on an information medium.

In a different embodiment, the hologram lens is designed as a convex lens, so that the +1-st order diffraction light is converged through the substrate thickness t2 while the zeroth order light (transmission light) is converged through the substrate thickness t1. In this embodiment, the +1-st order diffraction efficiency at the outside is set to be about 100%, while that at the inside is set to be smaller than 100%. If the zeroth order diffraction efficiency and the +1-st order diffraction efficiency of the hologram lens 107 are read as the +1-st order diffraction efficiency and the zeroth order diffraction efficiency of the hologram lens 107 in the explanation on the above-mentioned embodiments, the correction hologram 1221 can provide similar advantages by adopting a similar structure of the optical head apparatus. In this embodiment, color aberration can be reduced or eliminated for the substrate thickness t2. On the other hand, if the diffraction light is converged on the information medium and the light reflected therefrom is detected with a photosensor, tracking error signals of the so-called 3-beam method can be obtained from the output signals of the photosensor. In this case, it is preferable that the grating 1222 is blazed in a direction along which the intensity of diffracted light increases as the position approaches the optical axis.

Figure 21:
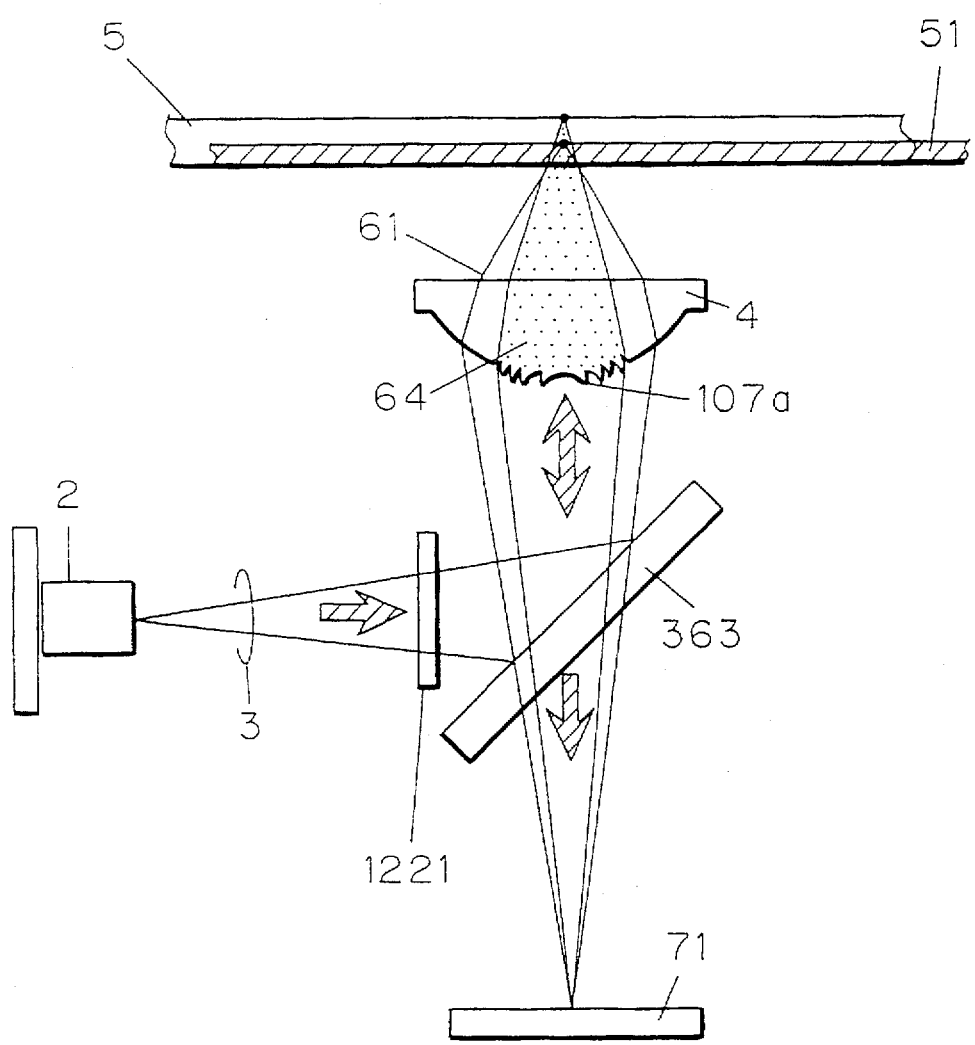
FIG. 21 is a perspective view of an optical head apparatus of a different embodiment of the invention.

FIG. 21 shows a different embodiment of the optical head apparatus. The optical head apparatus is different from that shown in FIG. 4 in points that a finite optical system is used and that the beam splitter 363 comprises a flat plate. Then, a number of optical components is reduced, and a cost of the apparatus is lowered. A light beam 3 emitted from the light source 3 propagates through the correction hologram element 1221 or a correction filter (not shown) which decreases optical intensity at the outside. Then, it is reflected by a beam splitter 363 by 90°. Then, it is converged by an object lens (2-focus lens) shown in FIG. 20 to be converged on the information medium 5, 51. The light reflected by the information medium 5, 51 propagates through the beam splitter 363 to be detected by a photosensor 71.

The correction filter 1225 has two patterns, that is, two portions 1226 for decreasing transmittance and a central step portion. As explained below, it can be fabricated by using a masking process for patterning only once. Then, it can be fabricated simply and at a lower cost. In the examples explained below, a metallic film (chromium film) is formed for the portions 1226 for decreasing transmittance. However, a dielectric film may be formed instead of the metallic film.

Figure 22A:
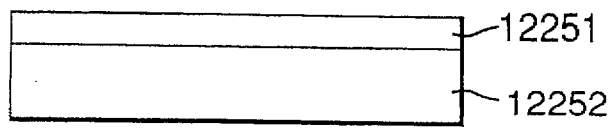
FIGS. 22A–22F are sectional views for explaining steps of a fabrication method of a correction filter.

FIGS. 22A–22F show an example of a fabrication process of the correction filter 1225. Light has components of amplitude (quantity of light) and phase. The correction filter 1225 is designed to modulate the amplitude or phase in a desired way. First, as shown in FIG. 22A, after a transparent plate 12252 is rinsed, it is coated with a resist film 12251. If the correction filter is formed on the surface of the beam splitter 42, as shown in FIG. 16, the plate 12252 represents the beam splitter 42.

Figure 22B:
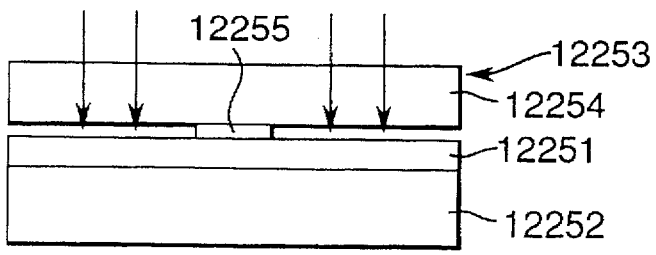

Next, as shown in FIG. 22B, a photomask 12253 is provided which has a mask material (for example chromium) 12255 for shading a light partly on a substrate 12254. Then, the resist film 12251 is exposed for patterning by the light with the photomask 12254 and developed.

Figure 22C:
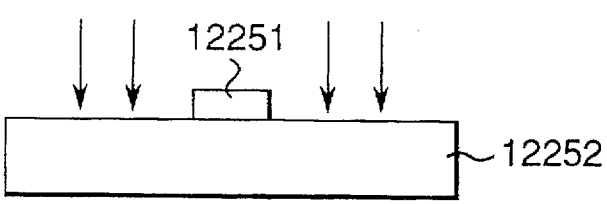
Figure 22D:
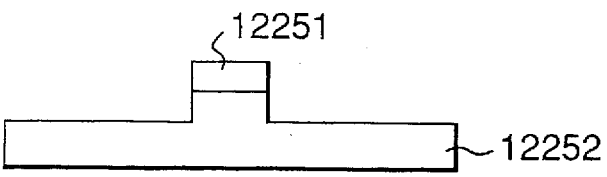

Then, as shown in FIG. 22C, the photomask is removed, and the resist film 12253 is developed. Then, the resist film 12253 remains only in an area corresponding to the transmission portion 1227 of the correction filter 1225.

Next, etching is performed by using the remaining resist film 12225 as a mask. A portion of the plate 12252 without resist film 12251 is only etched among the surface of the plate 12252, and a step is formed on which the remaining resist film 12251 exists.

Figure 22E:
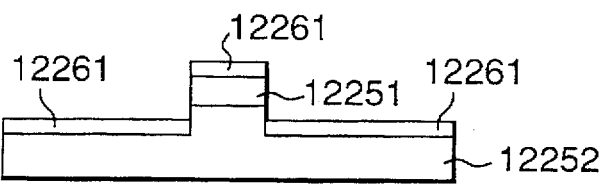

Next, as shown in FIG. 22E, a metallic film 12261 is formed further with deposition or sputtering. The thickness of the metallic film 12261 is smaller than the height of the step of the plate 12252.

Figure 22F:
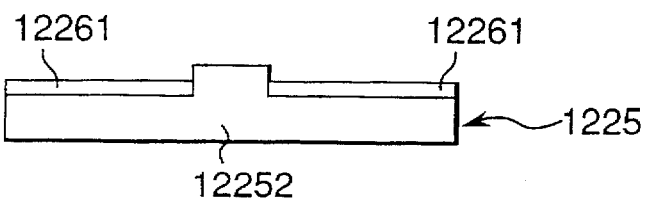

Finally, as shown in FIG. 22F, the resist film 12251 is removed with an organic solvent or the like. The metallic film on the resist film 12251 is also removed at the same time (lift-off). Thus, the correction filter is completed.

Figure 23A:
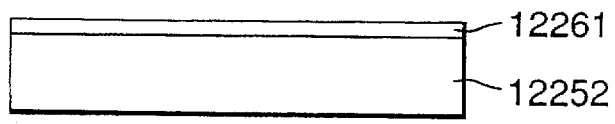
FIGS. 23A-23G are sectional views for explaining steps of another fabrication method of a correction filter.

FIGS. 23A–23G show another example of a fabrication process of the correction filter 1225. First, as shown in FIG. 23A, after a transparent plate 12252 is rinsed, a metallic film 12261 is deposited on the surface of the plate 12252.

Figure 23B:
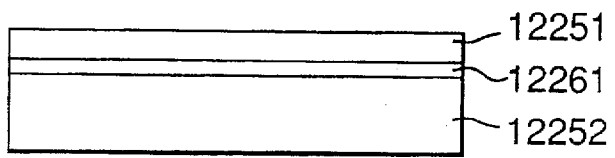

Next, as shown in FIG. 23B, a resist film 12251 is applied to the metallic film 12261.

Figure 23C:
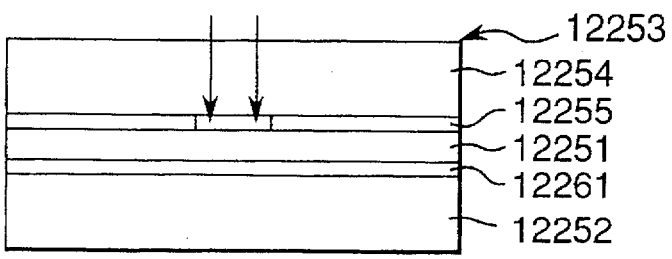

Next, as shown in FIG. 23C, a photomask 12253 is provided on the resist film 12251. The photomask 12253 comprises a mask material 12255 formed on a transparent substrate 12254 to allow a light to pass in a central portion. Then, the resist film 12251 is exposed for patterning through the photomask 12253.

Figure 23D:
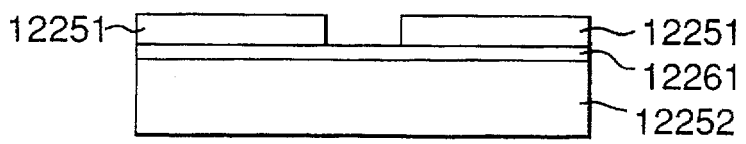

Next, the photomask 12253 is removed, and the resist film 12251 is developed. Thus, as shown in FIG. 23D, the resist film remains only on the area which is not exposed.

Figure 23E:
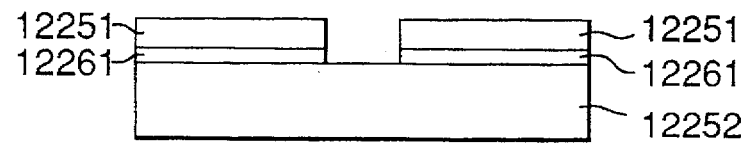

Then, the metallic film 12251 is etched by using the remaining resist film 12251 as a mask. Thus, as shown in FIG. 23E, the metallic film 12261 corresponding to the transmission portion 1227 is removed.

Figure 23F:
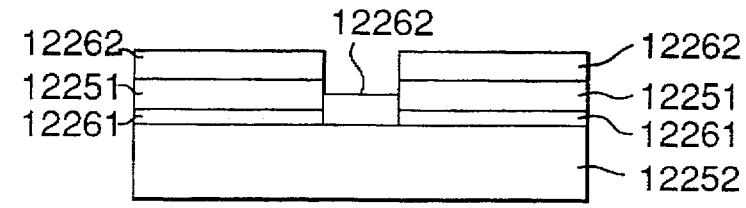

Next, as shown in FIG. 23F, a transparent film 12262 of SiO$_2$ or the like is formed further so as to have a thickness larger than that of the metallic film 12261.

Figure 23G:
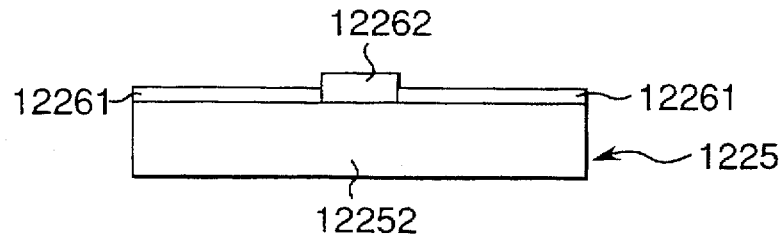

Finally, as shown in FIG. 23G, the resist film 12251 is removed with an organic solvent or the like. SiO$_2$ on the resist film 12251 on the resist film 12251 is also removed at the same time (lift-off). Thus, the correction filter is completed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical head apparatus comprising:
a light source which emits a light beam;
a lens which converges the light beam emitted by said light source into a micro-spot on an information medium, said lens having a plurality of focal points having different numerical apertures at the same side with respect to said lens, said lens comprising a combination of an object lens which refracts light and a hologram lens;
a correction element for correcting optical intensity of the light beam emitted by said light source, said correction element being provided in an optical path from said light source to said lens, said correction element having a first portion distant from an optical axis where an optical intensity is lowered more than in a second portion thereof around the optical axis; and
a photosensor which detects a light reflected by the information medium to output an electrical signal in correspondence to an optical intensity of the light.

2. The optical head apparatus according to claim 1, wherein hypothetical contour curves along which the transmittance or the zeroth order diffraction efficiency have the same values of said correction element are convex with respect to a radial direction from the optical axis to an outer peripheral of the correction element.

3. The optical head apparatus according to claim 1, wherein said correction element has a grating in the first portion thereof distant from the optical axis.

4. The optical head apparatus according to claim 1, further comprising a collimating lens provided between said light source and said object lens, wherein said correction element is integrated with said collimating lens.

5. The optical head apparatus according to claim 1, said photosensor comprising a first sensor for detecting servo signals and a second sensor which are arranged around the first sensor and having an area wider than the first sensor.

6. The optical head apparatus according to claim 1, wherein said light source radiates the light beam having different rates of change in optical intensity along first and second directions perpendicular to each other and perpendicular to the optical axis of the light beam, and the first portion of said correction element distant from the optical path is provided along the second direction which is defined as a direction along which the rate of change in optical intensity is the smallest.

7. The optical head apparatus according to claim 6, wherein hypothetical contour curves along which the transmittance or the zeroth order diffraction efficiency have the same values of said correction element are convex with respect to a radial direction from the optical axis to an outer peripheral of the correction element.

8. The optical head apparatus according to claim 6, wherein said correction element has a grating in the first portion thereof distant from the optical axis.

9. The optical head apparatus according to claim 8, wherein an average height of an uneven portion of the grating is equal to a height of the second portion around the optical axis.

10. The optical head apparatus according to claim 8, wherein the second portion around the optical axis of said correction element has a height larger than an average height of an uneven portion of the grating.

11. The optical head apparatus according to claim 8, wherein said grating of said correction element is blazed so that an intensity of first order diffraction light increases with increase in distance from the optical axis.

12. The optical head apparatus according to claim 8, wherein said grating of said correction element is blazed so that an intensity of first order diffraction light increases with decrease in distance from the optical axis.

13. The optical head apparatus according to claim 1, wherein said correction element further comprises a metallic film or a dielectric film in the first portion distant from the optical axis.

14. The optical head apparatus according to claim 13, wherein the second portion of said correction element around the optical axis has a height larger than that of the first portion.

15. The optical head apparatus according to claim 13, further comprising a beam splitter provided between said light source and said object lens, wherein said correction element is provided on a surface of said beam splitter.

16. An optical head apparatus comprising:
a light source which emits a light beam, said light source emitting the light beam having different rates of change in optical intensity along first and second directions perpendicular to each other and perpendicular to an optical axis of the light beam, the second direction being defined as a direction along which the rate of change in optical intensity is the smallest;
a correction element for correcting optical path length, said correction element being provided in an optical path from said light source to said lens, said correction element comprising a first portion distant from the optical axis in the second direction and a second portion around the optical axis, the second portion having an optical path length along said optical path shorter than the first portion;

a lens which converges the light beam emitted by said light source into a micro-spot on an information medium, said lens having a plurality of focal points having different numerical apertures at the same side with respect to said lens, said lens comprising a combination of an object lens which refracts light and a hologram lens; and a photosensor which detects a light reflected by the information medium to output an electrical signal in correspondence to an optical intensity of the light.

17. The optical head apparatus according to claim 16, wherein the first portion has a thickness smaller than the second portion.

18. An optical head apparatus comprising:

a light source which emits a light beam;

a lens which converges the light beam emitted by said light source into a micro-spot on an information medium, said lens having a plurality of focal points having different numerical apertures at the same side with respect to said lens, said lens comprising a combination of an object lens which refracts light and a hologram lens, said hologram lens being integrated with a plane having a larger curvature of two planes of said object lens; and a photosensor which detects a light reflected by the information medium to output an electrical signal in correspondence to an optical intensity of the light.

19. An optical head apparatus comprising:

a light source which emits a light beam;

a lens which converges the light beam emitted by said light source into a micro-spot on an information medium, said lens having a plurality of focal points having different numerical apertures at the same side with respect to said lens, said lens comprising a combination of an object lens which refracts light and a hologram lens; and a photosensor which detects a light reflected by the information medium to output an electrical signal in correspondence to an optical intensity of the light;

wherein said hologram lens of said lens is integrated with a part of a plane of the object lens, an average height of an uneven portion of a grating of said hologram lens is continuous to a height of a portion of said hologram lens having no grating, and an average surface of the uneven portion of the grating pattern and a surface of the portion having no grating pattern are designed to converge a light beam to diffraction limit.

* * * * *